(12) United States Patent
Lin-Hendel

(10) Patent No.: US 8,195,573 B2
(45) Date of Patent: Jun. 5, 2012

(54) SYSTEM AND METHOD FOR LIST SHOPPING OVER A COMPUTER NETWORK

(76) Inventor: Catherine Lin-Hendel, Los Gatos, CA (US)

( * ) Notice: Subject to any disclaimer, the term of this patent is extended or adjusted under 35 U.S.C. 154(b) by 1698 days.

(21) Appl. No.: 09/833,956

(22) Filed: Apr. 12, 2001

(65) Prior Publication Data
US 2003/0144911 A1    Jul. 31, 2003

(51) Int. Cl.
*G06F 17/00*    (2006.01)
(52) U.S. Cl. ........ 705/64; 705/2; 705/4; 705/5; 709/224
(58) Field of Classification Search .............. 705/64, 705/2, 4, 5, 1; 709/224; 707/3, 4, 5
See application file for complete search history.

(56) References Cited

U.S. PATENT DOCUMENTS

| | | | | |
|---|---|---|---|---|
| 5,590,197 | A * | 12/1996 | Chen et al. | 705/65 |
| 5,640,002 | A * | 6/1997 | Ruppert et al. | 235/462.46 |
| 5,664,110 | A * | 9/1997 | Green et al. | 705/26 |
| 5,864,845 | A * | 1/1999 | Voorhees et al. | 707/7 |
| 5,884,281 | A * | 3/1999 | Smith et al. | 705/26 |
| 5,940,807 | A * | 8/1999 | Purcell | 705/26 |
| 5,979,757 | A * | 11/1999 | Tracy et al. | 235/383 |
| 5,987,446 | A * | 11/1999 | Corey et al. | 707/3 |
| 6,006,225 | A * | 12/1999 | Bowman et al. | 707/5 |
| 6,012,055 | A * | 1/2000 | Campbell et al. | 707/5 |
| 6,023,683 | A * | 2/2000 | Johnson et al. | 705/26 |
| 6,101,482 | A * | 8/2000 | DiAngelo et al. | 705/26 |
| 6,115,690 | A * | 9/2000 | Wong | 705/7 |
| 6,119,101 | A * | 9/2000 | Peckover | 705/26 |
| 6,188,991 | B1 * | 2/2001 | Rosenweig et al. | 705/29 |
| 6,204,763 | B1 * | 3/2001 | Sone | 340/568.1 |
| 6,246,998 | B1 * | 6/2001 | Matsumori | 705/27 |
| 6,272,472 | B1 * | 8/2001 | Danneels et al. | 705/27 |
| 6,324,522 | B2 * | 11/2001 | Peterson et al. | 705/28 |
| 6,324,534 | B1 * | 11/2001 | Neal et al. | 707/3 |
| 6,341,271 | B1 * | 1/2002 | Salvo et al. | 705/28 |
| 6,345,273 | B1 * | 2/2002 | Cochran | 707/4 |
| 6,370,527 | B1 * | 4/2002 | Singhal | 707/6 |
| 6,381,597 | B1 * | 4/2002 | Lin | 707/707 |
| 6,415,270 | B1 * | 7/2002 | Rackson et al. | 705/36 R |
| 6,421,675 | B1 * | 7/2002 | Ryan et al. | 707/100 |

(Continued)

OTHER PUBLICATIONS

Dogpile Website (www.dogpile.com) Apr. 7, 2000; retrieved from the Internet on Nov. 2, 2003 from http://web.archive.org.*

(Continued)

*Primary Examiner* — Calvin L Hewitt, II
*Assistant Examiner* — John M Winter
(74) *Attorney, Agent, or Firm* — Mahamedi Paradice Kreisman LLP; Zurvan Mahamedi

(57) ABSTRACT

The present invention is a system for conducting commercial transactions over the Internet, whereby a shopper can simultaneously search for a plurality of items on at least one website with a single search command. The shopper can selectively specify the items of interest to be searched and can also specify and/or exclude websites to be searched. The system also searches a selectively alterable set of default website(s) and intelligently recommended website(s). Under one search command, the system simultaneously searches for all of the items on any combination of the following: site(s) specified by the user, a default website, an alterable set of default or intelligently recommended website(s). Information regarding the items retrieved as a result of the search is compiled under an alterable set of criteria, and displayed for viewing by the shopper. The shopper can simultaneously purchase selected ones of said items with one order command.

26 Claims, 3 Drawing Sheets

U.S. PATENT DOCUMENTS

| | | | |
|---|---|---|---|
| 6,578,014 B1 * | 6/2003 | Murcko, Jr. | 705/80 |
| 6,587,835 B1 * | 7/2003 | Treyz et al. | 705/14 |
| 6,636,848 B1 * | 10/2003 | Aridor et al. | 707/3 |
| 6,711,586 B1 * | 3/2004 | Wells | 707/104.1 |
| 6,785,671 B1 * | 8/2004 | Bailey et al. | 705/26.81 |
| 7,062,487 B1 * | 6/2006 | Nagaishi et al. | 707/6 |
| 7,080,070 B1 * | 7/2006 | Gavarini | 707/5 |
| 2002/0156685 A1 * | 10/2002 | Ehrlich et al. | 705/26 |

OTHER PUBLICATIONS

White, Ron, How Computers Work, Millennium Ed. Que Corporation, Sep. 1999.*

Derfler, Frank J. et. al. How Networks Work, Millennium Ed., Que Corporation, Jan. 2000.*

Gralla, Preston, How the Internet Works, Millennium Ed., Que Corporation, Aug. 1999.*

* cited by examiner

SYSTEM AND METHOD FOR LIST SHOPPING OVER A COMPUTER NETWORK

FIELD OF THE INVENTION

The present invention pertains to commercial transactions conducted over a computer network, and more particularly to a system and method for selecting and purchasing a plurality of items on such a network.

BACKGROUND OF THE INVENTION

Conducting commercial transactions over computer networks such as the Internet is commonplace today. As the number of Internet shoppers continues to increase, the number and corresponding dollar value of goods and services, i.e., items, purchased electronically in such manner also continues to increase. However, conventional techniques for searching for items to be purchased, are searching, viewing specifications and prices, and selecting for purchase of such items, one item at a time.

Specifically, in order to conduct such transactions today, a consumer has to search for such items one at a time by accessing and browsing web pages of a website, one web page and one website at a time. Searching for and purchasing items of interest in this manner is a very tedious, time consuming and frustrating process. Even the most sophisticated and advanced shopping search engines, such as www.MySimon.Com, which enables a shopper to enter product specifications, and then searches for the websites of participating merchants that may carry the items being searched, still requires that searching and purchasing be done one item at a time, one web page and one website at a time. Accordingly, it is an objective of the present invention to overcome the foregoing drawback.

SUMMARY

A system and method for conducting commercial transactions over the Internet, whereby a shopper, by using one search command, can simultaneously search for a plurality of items on at least one website in a single search action. The shopper specifies items of interest to be searched, and in one embodiment can also specify and/or exclude websites to be searched. In additional embodiments, the system searches a selectively alterable set of default or server recommended websites. To use the invention, the shopper enters a list of items in response to a series of prompts. Under one search command, the system then simultaneously searches for all of the specified items on the default site, the system recommended site(s), or site(s) specified by the shopper, or all of the above in another embodiment. Information regarding the items retrieved as a result of the search is then displayed for viewing by the shopper. The shopper can simultaneously purchase selected ones of said items.

DETAILED DESCRIPTION OF THE INVENTION

The present invention enables a shopper to selectively designate a plurality of items which they wish to purchase, simultaneously conduct a search for said items on a plurality of websites, view information found regarding the specified items, and then purchase all or some of these items. This enables shoppers to search for and purchase items without having to engage in the tedious and time-consuming process of searching for items one at a time, one web page and one website at a time as is conventionally done. The user can also simultaneously search for different types of items using the present invention.

The system and method of the present invention is implemented by software. The software is used in conjunction with a website that the shopper would visit to shop for items to be purchased. The software presents a series of on-screen prompts in response to which the shopper specifies the items to be searched and specifies information/preferences and/or answers questions regarding the items so that a search can be conducted for such items. The software alternately causes a search to be conducted on a default website, website(s) specified by the shopper, and/or on a selectively alterable set of default website(s), recommended website(s) specified by an intelligent software, or all of the above. The results of the search are then compiled, formatted, and displayed on a display device for viewing by the shopper who can purchase selected ones or all of the items found in the search, or further refine the search.

Figure 1A:
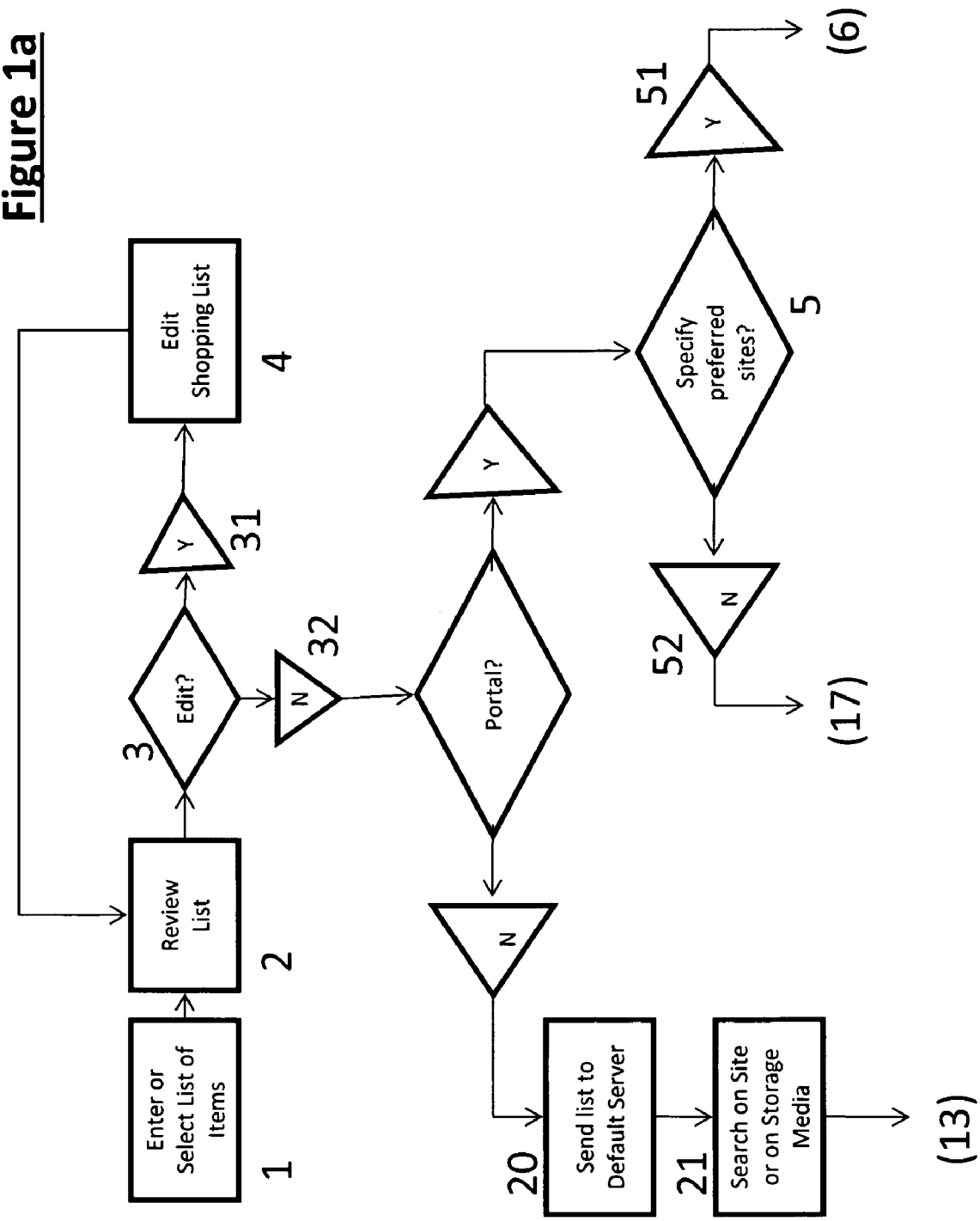
FIGS. 1a, 1b, and 1c show a flowchart depicting an example operation of the present invention. A selective subset of these steps can be implemented for desired application.
Figure 1B:
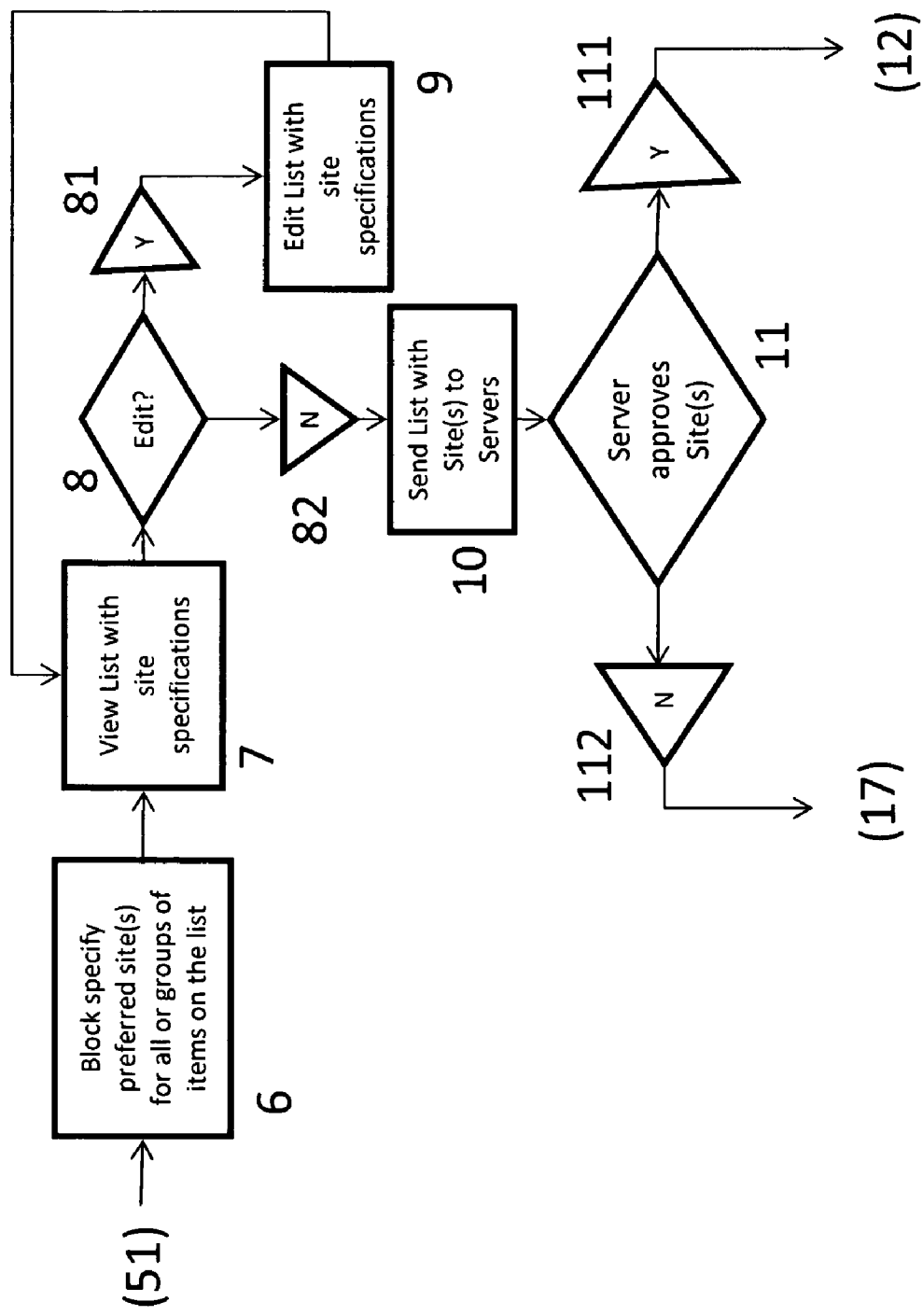
Figure 1C:
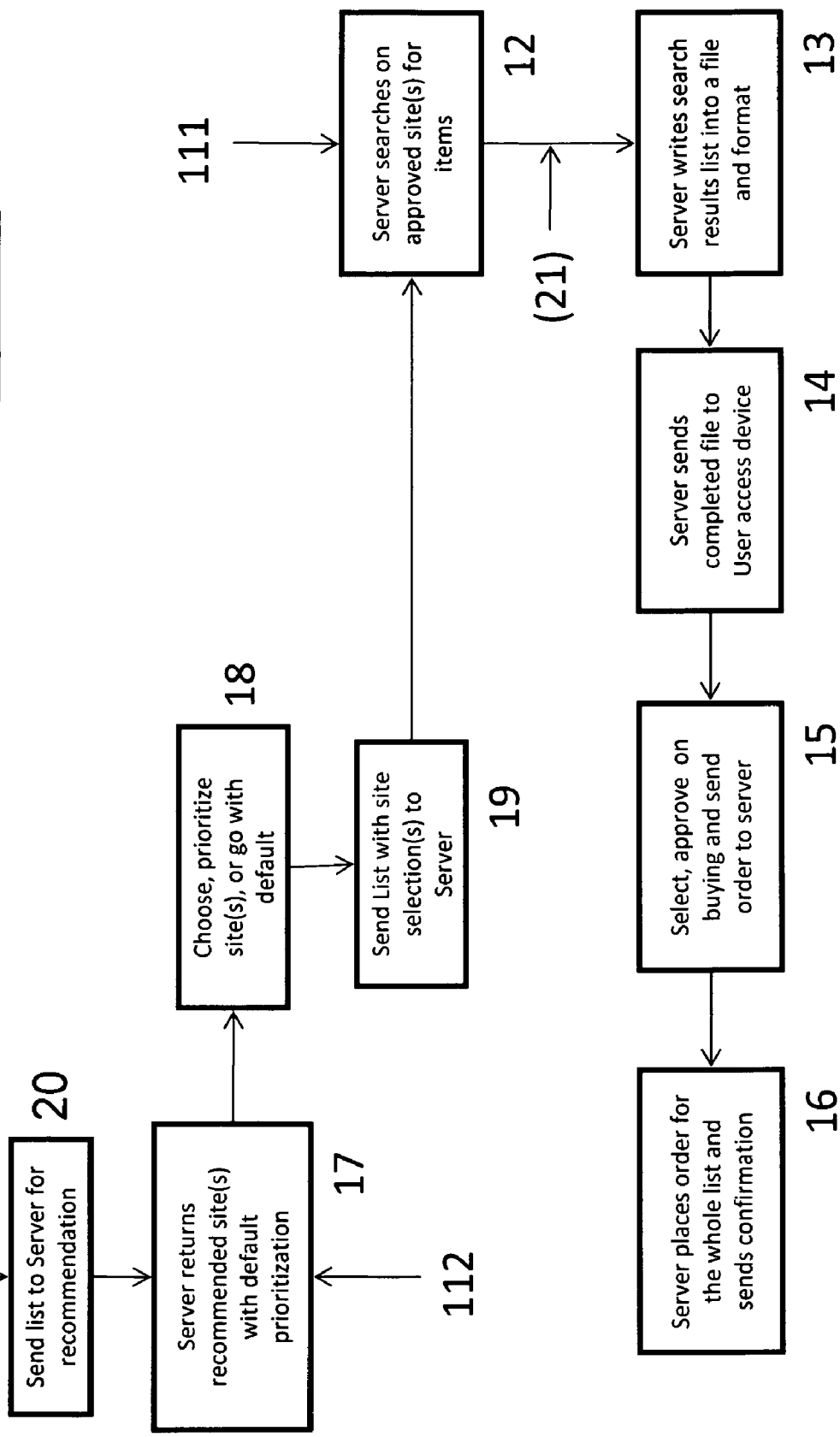

FIGS. 1a, 1b, and 1c show a flow chart depicting an example operation of the present invention. A selection of steps illustrated can be implemented for a desired application. At step 1, a shopper enters via keyboard, mouse, stylus, voice or otherwise, a list of the items they wish to purchase at a default site the shopper visits for such items. Alternatively, a shopper can select items to be searched from a default list of items offered by a project program such as a meal preparation program, by checking boxes for ingredients to be purchased from a website that sells food products. At step 2, the shopper reviews the shopping list. At step 3, the shopper decides whether to edit the shopping list. If the shopper wants to edit the shopping list, then the shopper does so at step 4 and the shopper can review the edited list at step 2. If at step 3, the shopper decides not to edit the shopping list and the default site is not a portal, at step 20 the list is sent to the site server. At step 21 the search is conducted on the default site. The process then proceeds to step 13 in FIG. 1c. If the default site is a portal on which the software is running, at step 5 the shopper is prompted to indicate whether he wants to specify any particular website or sites to be searched. If the shopper decides to specify a preferred website or sites, then at step 6 in FIG. 1b the shopper specifies such site or sites and/or excludes site or sites to be searched for some or all of the items in the shopping list. If at step 5 the shopper declines to specify a preferred website, in step 52 the shopping list is sent to the portal server for system recommendation for site(s) to search at step 17 in FIG. 1c.

At step 7 in FIG. 1b, the shopper views the list of website(s) he specified. At step 8, the shopper is prompted to indicate whether he wishes to edit the list of website(s) he specified. If so, then at step 9, the shopper edits the list of website(s), and then at step 7 views the edited list of site(s). If however, at step 8, the shopper decides not to edit the list of website(s) they specified, then at step 10 the list of specified site(s) is sent to the server of the website on which the software is running. At step 11, the server can approve good site or sites and reject problem site or sites. At step 12 the server searches approved sites, and if so desired, also search the system recommended sites for the items on the shopping list for comparison.

At step 13, the server writes the results, i.e., data gathered, of the search for all of the items from all of the sites searched into a file and formats the file. At step 14, the server sends the file to the shopper's access device. The file can be presented to the shopper in any form, including in a series of lists, wherein each list corresponds to items found on different websites or databases, or wherein each list is comprised of similar types of items or similarly priced items. The list of items can be presented for viewing by the shopper using any desired criteria. At step 15, the shopper reviews the file and selects and approves for purchase those items he desires, and such approval is sent to the server. At step 16, the server places an order at the appropriate website or sites for the items selected and approved for purchase by the shopper and then send a confirmation to the shopper.

If at step 11, the server rejects all websites specified by the shopper as problem sites, then at step 17 the server returns the list of specified sites together with reasons for rejection, and a list of recommended sites to the shopper. At step 18, if so desired, the shopper can choose and prioritize the system recommended sites, or selects to search all system recommended sites at the default prioritization recommended by the server. At step 19, the revised list of sites is then sent to the server for search at step 12, from where the process continues as previously described above.

If at step 5 the shopper does not specify any website, then the list of items to be purchased are sent at step 20 to the server. The server returns the list of recommended sites at step 17, from which point the process continues as previously described above.

It will further aid in understanding the operation of the present invention to consider the following example. If a shopper wants to shop for ingredients for a meal, the recipe or recipes for the meal are presented on-screen with a check box in front of each ingredient on the list of required ingredients, along with option entry blanks for the shopper to select or exclude items and to indicate other information such as how many servings are to be prepared to automatically populate an editable quantity column.

After the shopper enters their preferences/selections, the shopper is presented with a list of suppliers from whom they can purchase the goods. The shopper then selects and prioritizes the list of suppliers in order of descending preference. The website or database of the first most preferred supplier is then searched for the desired items on the list, and data regarding said items is collected and compiled. Then the website or database of the second most preferred supplier is searched for the specified items with said data being collected and compiled. The websites or databases of the remaining suppliers are similarly searched in order of descending preference.

The search results are then displayed for viewing by the shopper in a plurality of lists including product information, e.g., brand and price information, for each item with a separate list being displayed for each of the respective suppliers. If items are not available from the first most preferred supplier while available from the next most preferred supplier, those items would be listed separately in the first most preferred supplier search result list as being available from the next, e.g., second, most preferred supplier from whom they could be purchased. If the desired items are not available from the first or second most preferred supplier while available from the third most favored supplier, such items would be listed separately in the first most preferred supplier search result list as being available from the next, e.g., third, most preferred supplier. Similarly, if in the search result list for the second most preferred supplier there are items not available from the second most preferred supplier, the list would indicate whether those items were available from the first most preferred supplier, from the third most preferred supplier or from other suppliers in descending order of preferred suppliers.

The shopper then chooses one search list of goods, and places an order for the entire list of items at one time. Alternatively, the shopper can query for various search result listings using different criteria, and choose and place an order for goods from said different lists, for example, for price optimization. The software program then automatically places orders at the specified suppliers for all of the items in the list, and sends one confirmation to the shopper when the process is completed.

The present invention is implemented using software which can be written in many programming languages, or implemented with many data and information displaying or web-page generation tools. The present invention can be used on a global or local computer network, on a personal computer, on viewable storage media such as a CD or DVD, on a wireless telephone, on a wireless personal assistant such as a Palm Pilot, or on any type of wired or wireless device that enables digitally stored information to be viewed and internet access. Also, information displayed and viewed using the present invention can be printed, stored to other storage medium, and electronically mailed to third parties.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A method for conducting on-line commerce, comprising the steps of:
   receiving from a user, by one or more processes running on a server, a list of items;
   receiving a selection of at least one approved website by the one or more processes running on the server;
   approving, by the one or more processes running on the server, the selection of at least one website;
   creating a search list by searching, by the processes running on the server, the selection of said at least one approved website for said list of items and displaying the search list to the user via a user access device, wherein the search list comprises at least a portion of said list of items;
   receiving, by the one or more processes running on the server, a selection and approval of at least a portion of said list of items;
   placing an order by the one or more processes running on the server for said at least a portion of said list of items; and
   sending a confirmation to the user by the one or more processes running on the server.

2. The method according to claim 1, wherein the step of receiving a selection of at least one approved website comprises receiving a default website specified by the user.

3. The method according to claim 1, wherein the step of creating a search list includes:
   displaying the search list on a display device for viewing by the user, the search list providing information regarding all of the list of items searched for.

4. The method according to claim 3, further comprising the step of:
   receiving data indicating that a particular one of the at least one website that was searched does not have a particular one of the items available for sale, wherein the received data indicates if any of the other websites searched has the item available for sale.

5. The method according to claim 1, wherein the step of creating the search list includes:
　displaying, in a plurality of lists, the information found during the search, each one of the plurality of lists displaying search results from a different one of the websites searched.

6. The method according to claim 5, wherein the step of placing an order includes:
　providing a software-based interface configured to enable the user to place one order for purchasing all or some of the items.

7. The method according to claim 1, further comprising the step of:
　receiving, by the one or more processes running on the server, display criteria from the user, such that the step of creating the search list includes displaying the search list according to the display criteria specified by the user.

8. The method according to claim 1, wherein the step of creating the search list comprises the step of:
　searching the at least one website in a prioritized order specified by the user.

9. The method according to claim 1, further comprising the steps of:
　displaying a list of preferred websites on a display device;
　prompting the user to edit the list of preferred websites;
　receiving from the user input provided in response to the step of prompting; and
　editing the list of preferred websites in accordance with the input provided by the user; wherein the steps of displaying the list of preferred websites, prompting, receiving, and editing are performed before the step of searching.

10. The method according to claim 1, wherein the step of receiving a list of items from the user comprises receiving a shopping list.

11. The method according to claim 1, further comprising the step of:
　prompting the user to edit the list of items before the searching.

12. The method according to claim 1, wherein the list of items includes different types of items.

13. The method according to claim 1, wherein the step of placing an order includes:
　receiving data including an at least one corresponding website selected and approved by a user; and
　placing a single order for at least a portion of said list of items at the at least one corresponding website.

14. A system for conducting on-line commerce, comprising:
　one or more processors;
　a memory storing executable instructions that when executed by the one or more processors causes the one or more processors to perform operations comprising:
　receiving from a user a list of items;
　receiving a selection of at least one approved website;
　approving the selection of at least one website;
　creating a search list by searching, the selection of said at least one approved website for said list of items and displaying the search list to the user via a user access device, wherein the search list comprises at least a portion of said list of items;
　receiving a selection and approval of at least a portion of said list of items;
　placing an order for said at least a portion of said list of items; and
　sending a confirmation to the user.

15. The system of claim 14, wherein the operation of receiving a selection of at least one approved website comprises receiving a default website specified by the user.

16. The system of claim 14, wherein the operation of creating a search list includes:
　displaying the search list on a display device for viewing by the user, the search list providing information regarding all of the list of items searched for.

17. The system of claim 16, wherein the one or more processors are configured to perform the operations that further comprise:
　receiving data indicating that a particular one of the at least one website that was searched does not have a particular one of the items available for sale, wherein the received data indicates if any of the other websites searched has the item available for sale.

18. The system of claim 14, wherein the operation of creating the search list includes:
　displaying, in a plurality of lists, the information found during the search, each one of the plurality of lists displaying search results from a different one of the websites searched.

19. The system of claim 18, wherein the operation of placing an order includes:
　providing a software-based interface configured to enable the user to place one order for purchasing all or some of the items.

20. The system of claim 14, wherein the one or more processors are configured to perform the operations further comprising:
　receiving display criteria from the user, such that creating the search list includes displaying the search list according to the display criteria from the user.

21. The system of claim 14, wherein the operation of creating the search list includes:
　searching the at least one website in a prioritized order specified by the user.

22. The system of claim 14, wherein the one or more processors are configured to perform the operations further comprising:
　displaying a list of preferred websites on a display device;
　prompting the user to edit the list of preferred websites;
　receiving from the user input provided in response to the operation of prompting; and
　editing the list of preferred websites in accordance with the input provided by the user;
　wherein the operations of displaying the list of preferred websites, prompting, receiving, and editing are performed before the operation of searching.

23. The system of claim 14, wherein the operation of receiving a list of items from the user comprises receiving a shopping list.

24. The system of claim 14, wherein the one or more processors are configured to perform the operations further comprising:
　prompting the user to edit the list of items received from the user before creating the search list.

25. The system of claim 14, wherein the list of items includes different types of items.

26. The system of claim 14, wherein the operation of placing an order includes:
　receiving data including an at least one corresponding website selected and approved by a user; and
　placing a single order for the at least a portion of said list of items at the at least one selected and approved website.

* * * * *